July 15, 1924.
F. W. KORB
MEASURING TOOL
Filed Dec. 20, 1923
1,501,170
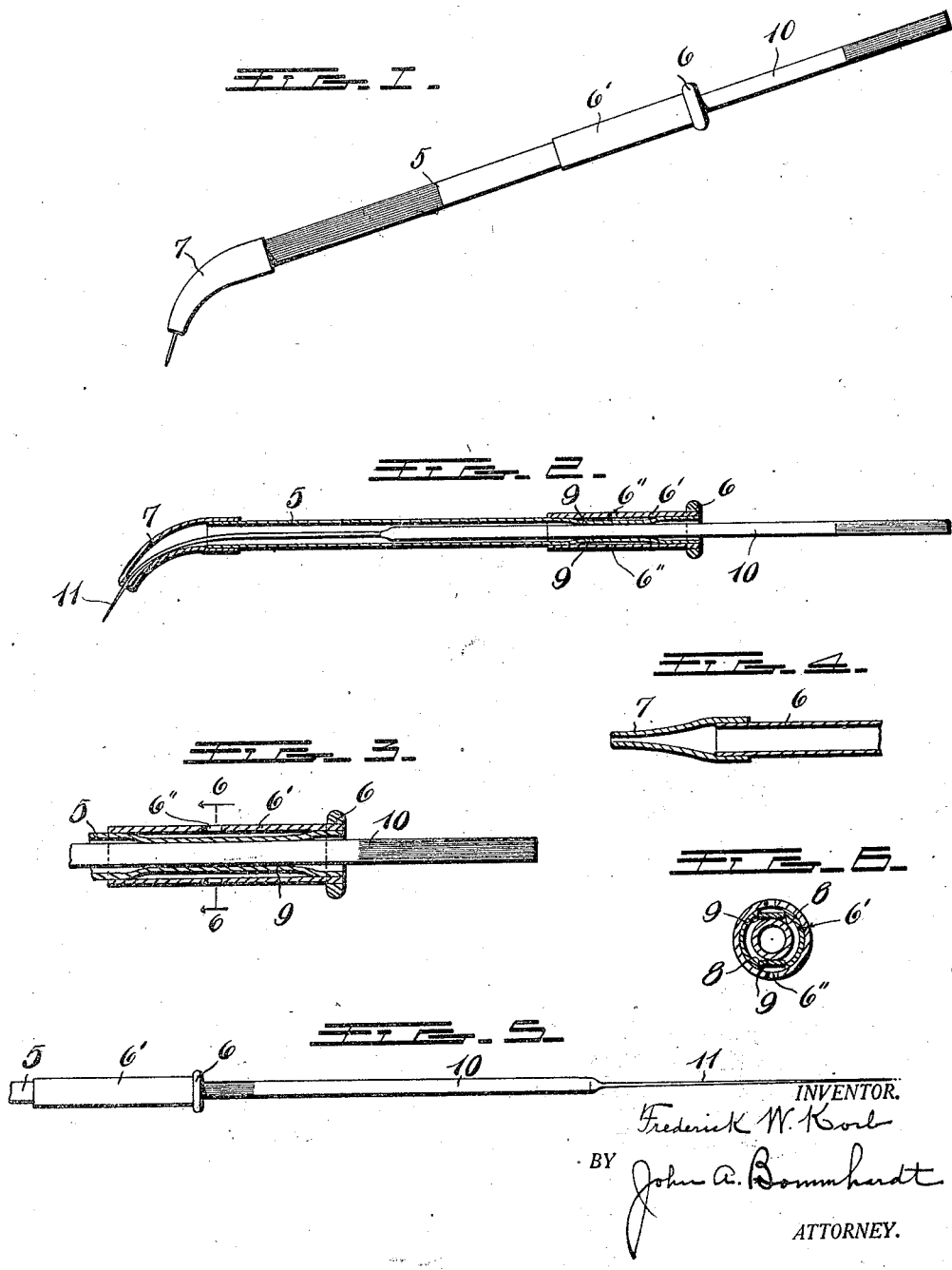

Patented July 15, 1924.

1,501,170

UNITED STATES PATENT OFFICE.

FREDERICK W. KORB, OF CLEVELAND, OHIO.

MEASURING TOOL.

Application filed December 20, 1923. Serial No. 681,756.

*To all whom it may concern:*

Be it known that I, FREDERICK W. KORB, a citizen of the United States, residing at Cleveland, in the county of Cuyahoga and State of Ohio, have invented certain new and useful Improvements in Measuring Tools, of which the following is a specification.

This invention relates to improvements in measuring tools, having for an object to provide a tool embodying means for accurately determining the depth of holes or cavities and for measuring the length of root canals in teeth or locating a foreign body therein.

Another object is to provide a simple and reliable means to retain the movable parts in any adjusted position for measuring.

A further object is to provide a tool of this character having a curved tapered end for engagement with a tooth whereby to facilitate use when measuring the back teeth.

It is likewise an object to provide a tool of this character having integrally formed yieldable gripping jaws carried by the sleeve to retain a slidable probe in any adjusted position.

Other objects will be in part obvious and in part pointed out hereinafter.

In order that the invention and its mode of operation may be readily understood by persons skilled in the art, I have in the accompanying illustrative drawings, and in the following detailed description based thereon set out one possible embodiment of the same.

In these drawings:

Fig. 1 is an enlarged side elevation of the tool.

Fig. 2 is a central longitudinal section thereof.

Fig. 3 is a detail of the yieldable jaws.

Fig. 4 is a sectional view of a modified form of nipple.

Fig. 5 shows how the sleeve is used to lengthen an instrument handle.

Fig. 6 is a section on the line 6—6 of Figure 3.

Having more particular reference to the drawings throughout which similar characters of reference designate similar parts, this measuring tool may be stated as comprising an elongated sleeve 5, one end of which is provided with an annular radial rib 6, which is preferably in the form of a collar carried by a shell or guard member securely arranged over the sleeve end.

As shown, the shell or guard 6' extends over the sleeve 5 a distance sufficient to entirely cover slits in said sleeve and thereby prevent accidental injury to the operator due to a probe being pushed through one of said slits. This shell 6' is provided with a pair of opposed apertures 6'' through which an instrument may be inserted to increase the tension of gripping jaws to be pointed out hereinafter. This rib or collar 6 serves as a finger piece for the user while adjusting the instrument. The forward end of the sleeve 5 is snugly fitted within the inner end of a nipple 7 which as shown is tapered and curved to a comparatively small end, this end being adapted to rest upon a tooth or the like at the entrance to a cavity whose depth is to be measured. The connection between the sleeve 5 and the tapered nipple as shown in the drawing is such as to eliminate any irregularities or projections which would interfere with the passage of a probe or the like, as hereinafter described.

Adjacent the rib 6 a set of circumferentially spaced longitudinally extended slits 8 are formed in the sleeve 5, certain portions 9 of the sleeve between the slits being stamped or pressed inwardly to provide yieldable gripping jaws whose function will be pointed out.

A separate instrument is adapted for positioning in the sleeve and consists of a body portion 10 of greater length than the sleeve and of such diameter as to be retainable in any adjusted position, through engagement with said yieldable jaws. Carried by the forward end of this body portion 10 is a flexible tapered spindle or probe 11 which is adapted for projection or extension through and beyond the opening in the curved tapered nipple 7.

In using this tool, the end of the probe is inserted to the bottom of the hole or cavity whose depth is to be determined. The operator then moves the sleeve 5 forwardly until the tapered end comes in contact with the tooth at the entrance to the cavity. At this stage of operation, the tool is removed and the projecting portion of the probe measured by a scale or rule, thus accurately determining the depth of the cavity, or the progress made where a tooth is being drilled. The use of a scale carried by the tool itself is undesirable because of the necessary indistinctness due to the delicacy of the tool as a whole, and consequently a separate scale is employed to overcome this fault. This provides absolutely accurate measurement.

The curvature of the tapered nipple 7 is very desirable since it permits use of the tool for measuring the depth of cavities or the like in the back teeth as well as the others. The probe, as stated, is flexible and consequently follows the curvature of the nipple and enters the cavity being measured, regardless of its angle or location.

The formation of the yieldable jaws integrally with the sleeve eliminates extra parts and provides an absolutely reliable means for retaining the instrument in any adjusted position.

In Figure 4 of the accompanying drawing the tapered nipple is modified to the extent of being straight rather than curved. The connection between the nipple and the sleeve is identical to that used in the preferred form.

It is often desired to lengthen the handle portion of an instrument of the character shown, and as illustrated in the drawing, my combination may be reversed and will serve this purpose to a nicety, the gripping jaws acting to hold the parts in any adjusted position.

Certain changes in some of the details of construction may be resorted to and such changes as fall within the scope of the appended claims, I consider within the spirit of my invention.

I claim:

1. A measuring tool of the character described comprising an elongated sleeve having one end tapered, an annular radial rib at the other end of said sleeve, an instrument slidable in the sleeve and adapted for extension beyond the tapered end a distance equal to the depth of an opening being measured, and spring means integrally formed with the sleeve to retain said instrument in any adjusted position.

2. A measuring tool of the character described comprising an elongated sleeve having one end tapered, an annular radial rib at the other end of said sleeve, said sleeve being slit longitudinally at circumferentially spaced points near said rib, certain portions of the sleeve between said slits being stamped inwardly to provide yieldable gripping jaws, an instrument adapted for positioning in said sleeve and to have one end projected beyond the tapered end of the sleeve a distance equal to the depth of an opening being measured, and said jaws being adapted to retain the instrument in any adjusted position.

3. A measuring tool of the character described comprising an elongated sleeve, a tapered curved nipple arranged at one end of the sleeve, an annular radial rib carried by the other end of the sleeve, said sleeve being slit longitudinally at circumferentially spaced points near the rib, certain portions of the sleeve between the slits being stamped inwardly to form yieldable gripping jaws, an instrument adapted to be arranged in the sleeve and including a body portion having a flexible probe at one end, said probe being adapted for projection beyond the end of the nipple a distance equal to the depth of an opening being measured and said jaws being engaged with said body portion to retain the instrument in any adjusted position.

4. A measuring tool of the character described comprising an elongated sleeve, a tapered curved nipple arranged over one end of the sleeve, said sleeve being slit longitudinally at circumferentially spaced points near the other end, certain portions of the sleeve between the slits being pressed inwardly to form yieldable gripping jaws, a shell surrounding the sleeve to cover the slits and jaws, a collar carried by the slit end of the sleeve to form a finger piece, and an instrument adapted to be arranged in the sleeve and to be held by the jaws in any adjusted position.

FREDERICK W. KORB.